United States Patent [19]
Liva et al.

[11] Patent Number: 5,237,171
[45] Date of Patent: Aug. 17, 1993

[54] OBJECT MOVEMENT DETECTOR SYSTEM

[75] Inventors: Michael Liva, Wayne; Alex MacDonald, Hampton; Luis Marrero, Lincoln Park, all of N.J.

[73] Assignee: Pro Optical Technologies Inc., Maplewood, N.J.

[21] Appl. No.: 762,296

[22] Filed: Sep. 19, 1991
(Under 37 CFR 1.47)

[51] Int. Cl.[5] .............................................. H01J 5/16
[52] U.S. Cl. .............................. 250/227.1; 250/227.24
[58] Field of Search ..................... 250/227.11, 227.20, 250/227.24, 227.28, 239, 227.21; 356/73.1; 385/12

[56] References Cited

U.S. PATENT DOCUMENTS

| | | | |
|---|---|---|---|
| 4,225,230 | 9/1980 | Dostoomian et al. | 250/227.11 |
| 4,737,624 | 4/1988 | Schwarte | 250/227.21 |
| 4,978,850 | 12/1990 | Nakamura et al. | 250/227.11 |
| 5,028,769 | 7/1991 | Claypool et al. | 250/227.28 |

Primary Examiner—David C. Nelms
Assistant Examiner—John R. Lee
Attorney, Agent, or Firm—Barry G. Magidoff; Paul J. Sutton; Anthony Amaral, Jr.

[57] ABSTRACT

A head unit for remote light sensing utilizes a lens secured in one end opening proximate to the light to be sensed, as well as a passive light source having a radiating end and a passive light collector having a receiving end, the source and collector being secured in a second opening such that both are substantially adjacent to the focal point of the lens and to each other such that the lens substantially collimates light emitted from the passive light source, and focuses received external collimated light at the focal point of the lens. The passive light source and passive light collector are respectively connectible to a powered light source and a photoelectric detector.

6 Claims, 5 Drawing Sheets

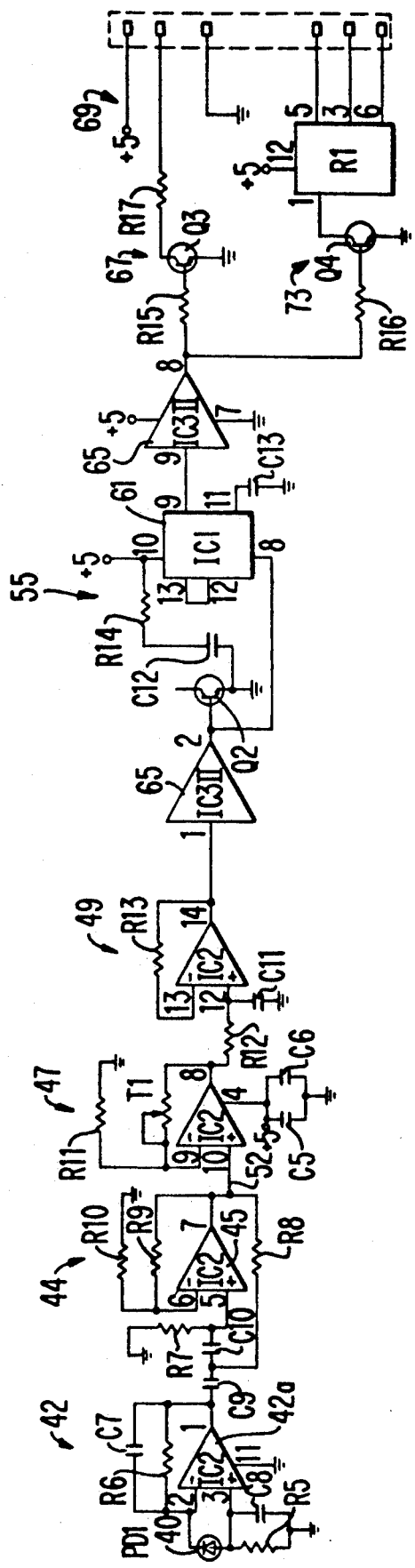
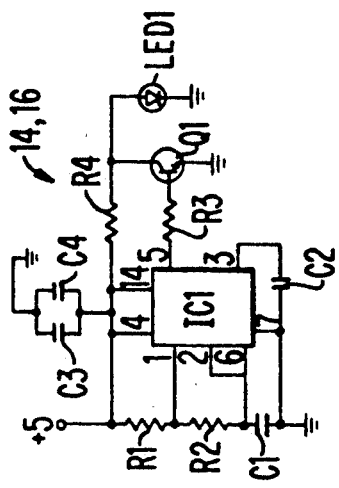
FIG. 4
FIG. 4e

OBJECT MOVEMENT DETECTOR SYSTEM

BACKGROUND OF THE INVENTION

This invention relates to a passive remote head for a photoelectric detection and counting apparatus wherein the head is remote from any power source and thus can be used under many conditions where a power source may be dangerous.

Available photoelectric counting devices generally include a sensor head having a light source and a light detection device. In the prior art, the power source and/or the source of light itself must be within the head or within 5 or 6 feet of the head in order to obtain a useful effect. When using the sensor device under conditions such as the presence of highly combustible or explosive gases or other materials, the presence of a power source intrinsically reduces the safety of the system.

Previously available photoelectric detection and counting devices include a photo-sensor and a light emitting device directed towards, for example, a continuous flow of objects on a conveyor which are to be monitored, for example, for the purpose of counting the objects and to determine that a given number pass within a given time period. In this exemplary application, as one after the other of the objects to be detected by the sensor passes in front of the sensor head, the objects to be detected break the light beam being directed back to the element in the head.

Depending upon the material to be detected and counted, the counter can be based upon a continuous stream of light from the light source to a reflector element and back to the sensor element in the head, which is broken by a passing object; alternatively, the continuous beam of light can be reflected by the object to be counted, thereby impinging upon the sensor element in the head. In either case, the source of the light has previously been either in the head or in a power source within, usually, 5 or 6 feet of the head. Such a power source, e.g., electricity, can of course be a significant problem when the environment is filled with a highly combustible or explosive gas or vapor, such as volatile hydrocarbons, or hydrogen gas. Such photoelectric devices can also be useful for the detection of the movement of a machine part from one position to a second predetermined position, as well as many other applications involving the movement of solid objects.

Sensors for such photoelectric devices are of two general types: in the first, a single housing contains both the light emitter and the receiver and a reflecting target is used to rebound the beam from the emitter back to the receiver, across the path of the objects to be detected. The second type uses an emitter and a receiver in separate and opposed housings, which are placed on opposite sides of the path of the objects to be detected, with a beam being transmitted directly from the emitter across that path to the receiver. The first type of sensing system of course is more compact, which at times becomes critical to the application to which the sensor is to be put. It is further desirable, especially in a situation where the sensor head is located at a distance from any control means, that the optical system be extremely tolerant of the distance between the lens and the object to be measured, or the reflecting surface.

SUMMARY OF THE INVENTION

It is accordingly an object of the present invention to provide a photoelectric broadcasting and collection head unit which can be used in combustible environments. It is a further object of the present invention to provide a photosensing and broadcasting head which can be used at extreme distances, i.e., substantially more than 20 feet, from any powered device.

These and additional objects and features are provided by the present invention, in which a light transmitting and collection head unit, for use with photoelectric sensing apparatus, comprises a hollow body structure having a front opening and a rear opening, a single lens secured into and substantially wholly covering the front opening, and a pair of optical conductor fibers, secured in the rear opening and extending into the body of the head, the pair comprising a passive light source having a radiating end and a passive light collector having a receiving end, respectively. The passive light source radiating end and the passive light collector receiving end are substantially adjacent to each other and to the focal point of the single lens, both facing directly towards the lens surface, such that all light passing to and from the two ends, respectively, passes through the entire lens.

The lens is adapted and positioned so as substantially to be transparent to the emitted light wavelength, substantially to collimate any light emitted from the passive light source into and through the lens, and directed forwardly of the head, and substantially to focus, at the focal point of the lens, any collected collimated light passing through the lens from a location forward and outside of the head. Light guide means are operably connected to each of the passive light source and passive light collector means for transmitting of light between the passive broadcasting and collection head and remotely located powered light source and photoelectric detector means, respectively.

The relative orientation of the light source broadcasting end and the light receiving end is not significant; it is preferred, however, that the two ends be in substantially a single plane, which is substantially perpendicular to the optical axis of the lens, and wherein the plane also includes the focal point of the lens. The focal point is most preferably intermediate the two fiber ends. The sensor head can be separated from the powered apparatus, including the photoelectric sensors, by a distance of as much as 500 meters. The optical light guides operably connecting the passive head to the light source and the photoelectric sensor detectors preferably are communications quality glass fibers, most preferably a single fiber being used for each of the broadcasting and receiving sources.

BRIEF DESCRIPTION OF THE DRAWINGS

A preferred embodiment of this invention is further described below, by way of example and not exclusion, by reference to the accompanying drawings. These drawings display certain portions of the invention in schematic form. Details of such schematically shown portions are readily known to those in the art based upon the following verbal description and the context of the drawings.

Referring to the drawings:

FIGS. 4 and 4e are circuit schematics for the photoelectric sensor system of FIG. 1;

DETAILED DESCRIPTION OF THE INVENTION

Figure 1:
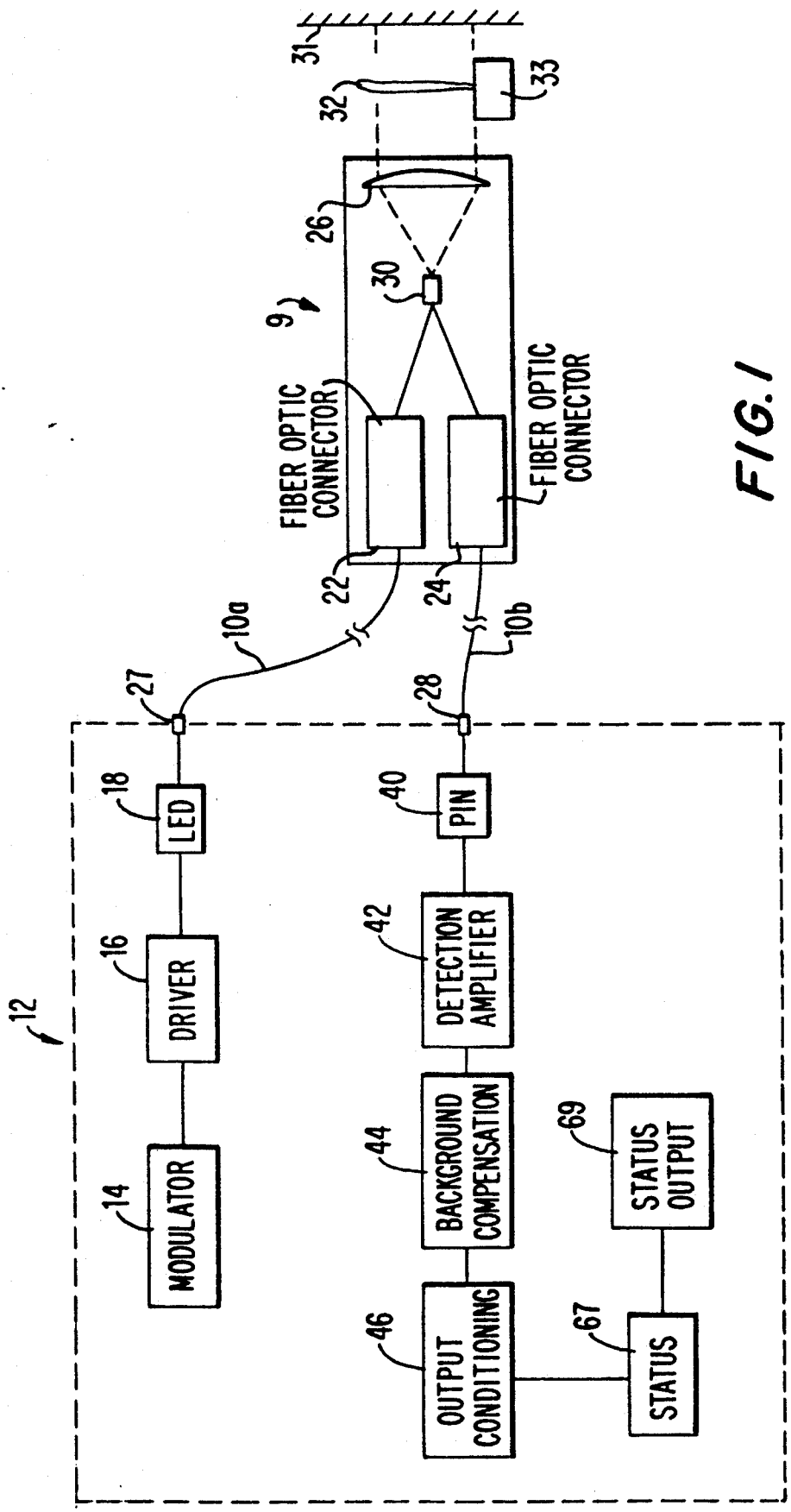
FIG. 1 comprises a diagrammatic block diagram of a photoelectric detector and powered light source base unit connected to a passive light broadcasting and receiving head unit.

Referring to FIG. 1, a photoelectric detecting device is shown comprising generally a passive optical head unit, generally indicated by the numeral 9, optically connected by a pair of light guide optical fibers 10a,10b to a photoelectric generating and sensing base unit, generally designated by the numeral 12, shown in block diagram form. The light generating means is shown as comprising a modulator, or oscillator 14, and an amplifier or driver 16. The modulator, or oscillator, 14 and the driver, or amplifier, 16 together comprise what is generally known as a pulse generator, which generates pulses of light from the light emitting diode 18, at desired frequencies and amplitudes. It has previously been found that pulsed light emitters, for use in detecting the presence of objects passing across the beam, exhibit greater stability and less sensitivity to changes in ambient light conditions than do continuous or steady state light emitting systems. Thus, it is preferred that the light be emitted in a pulsating manner, at a pulse rate, or frequency, of approximately 1000 hertz, or greater, but preferably not above about 8000 Hz, and that the detector system be tuned so as to exclude all light sources having a lower, or higher, pulse frequency. Thus, when the light received has a pulse rate lower than the predetermined frequency of the LED, or a steady state ambient light impinges upon the photo detector, it is not counted as a detection. One means of tuning of the photosensitive detector is shown, for example, in U.S. Pat. No 3,867,628.

Figure 2:
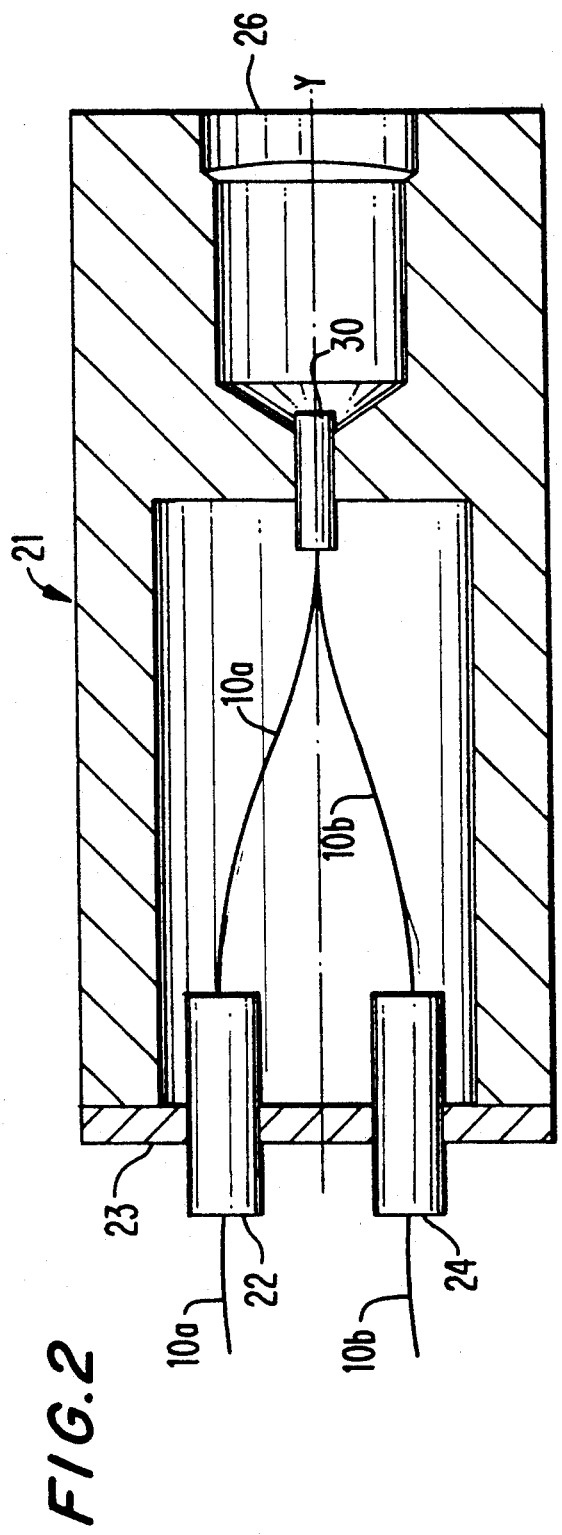
FIG. 2 is a diagrammatic cross-section view of the preferred embodiment of a head unit as shown in FIG. 1.
Figure 3:
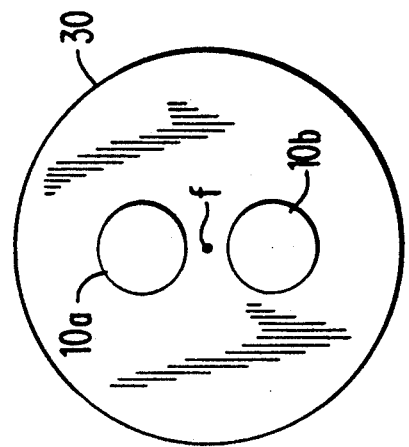
FIG. 3 is a cut-away end view of a portion of the head unit of FIG. 2.

The optical head unit, as shown in FIGS. 1 through 3, comprises a body portion, generally indicated by the numeral 21, formed to have two hollow portions, a rear chamber covered by a back plate 23, through which fiber optic connectors 22,24 are inserted and through which pass fibers 10a,10b, respectively. The front chamber of the head 21 is covered by a transparent optical lens 26 at its forward end and is provided with an optical fiber ferrule 30, held within an opening between the front and rear chambers, and which holds the optical fibers 10a,b such that the ends of each of the optical fibers 10a,b are preferably in a single plane substantially parallel to the plane of the lens 26, substantially perpendicular to the lens axis, Y, and substantially adjacent to the focal point, "f", of the lens 26. The two optical fibers 10a,b preferably are juxtaposed on opposing sides of the focal point of the lens and in the same plane as the focal point, "f". As shown the two optical fibers 10a,10b are separated by a small distance, preferably not greater than the diameter of each fiber. These optical fibers 10a,b are preferably of the type generally used for data and voice communication by, for example, long distance telephone companies, for what is presently the best combination of price and performance; such fibers are identified as:

62.5/125 GI Multimode Data Comm, by their manufacturers

AT&T, Siecore, ITT, 3M, and others.

These optical fibers are presently made of glass, for best results. It is recognized that even better performance may be achieved, at higher cost, by utilizing larger core, low loss fiber, or on the other hand, less costly higher loss fiber can be used where peak performance is less important.

The optical lens can be formed of, e.g., standard optical glass, silica quartz, sapphire, or even plastics such as polycarbonate, depending upon the operating environment to which it may be exposed. In one suitable configuration, the optical lens can have a diameter of about 0.75 in., a 1 inch focal length, and an "f" number of 1.8 or smaller, i.e., greater light gathering power.

The photoelectric generating and sensing base unit 12 and the remote optical head unit 9 are interconnected by means of a pair of flexible optical fibers 10a,10b and optical coupling means 22,24 and 27,28.

The base unit 12 generates intermittent short light pulses preferably having a pulse frequency of at least 1000 pulses per second (hertz,"Hz"). Although a constant amplitude light source can be used for this system, it is generally preferred, in order to eliminate background light interference, that a high frequency pulse be provided. Generally, such optical "noise" received from natural sources is substantially constant in nature, i.e., zero Hz, and from certain man-made light sources, such as fluorescent lights, are of relatively low frequency, e.g., pulses of approximately 120 Hz. Thus, by providing a detector light having frequencies of greater than about 1000 Hz, and providing as part of the detection means an electronic filter that eliminates background light of lower (and higher) pulse rates, only the detection system light is sensed by the electronic system. A power supply of as low as five volts has been found to be sufficient to operate both the light source and the detection system.

To accomplish this result in this preferred example, driver 16 is switched by a modulator 14 to power a light emitting diode 18 at the desired pulse rate. The modulator 14, or oscillator, provides a square wave output to the LED, turning it on to provide bursts of light at the desired pulse rate. The light emitting diode 18 need only provide normal, or noncoherent, light, but laser light can be used, if desired, or if required by the particular circumstances to which the photosensor system is put. The light from the diode 18 passes through an optical connector 27 and the optical light guide fiber 10a, through a fiber optic connector 22 and is broadcast from the end of the fiber 10a held in the ferrule 30 towards a retro-reflector surface 31. As an object 32 is moved along, for example, a conveyor belt 33, the object 32 intersects the beam of light emanating from the single lens 26 thereby, during the period of its passage, halting the reflection of light from the reflector surface 31 back through the lens 26 and into the end of the collector light guide fiber 10b, held within the ferrule 30, adjacent the light emitter fiber 10a.

The received reflected light is then conveyed along the optical fiber 10b from the optical head 9 to the photosensor 40.

The system of the present invention is designed to efficiently transmit the light to the optical head 9 and to return reflected light back to the electronic sensing system. However, even by improving the efficiency of the system by using a single lens and a pair of communication quality light transmitting glass fibers (or a plurality of receiving fibers surrounding a single emission fiber), the light received by the detection system, especially when the remote head is located at its extreme range, i.e., about 500 meters, is of a very low intensity. The detection circuit must be capable of dealing with unusually low signal levels, i.e., even less than 50 nanowatts ("nW") of optical power.

Figure 4A:
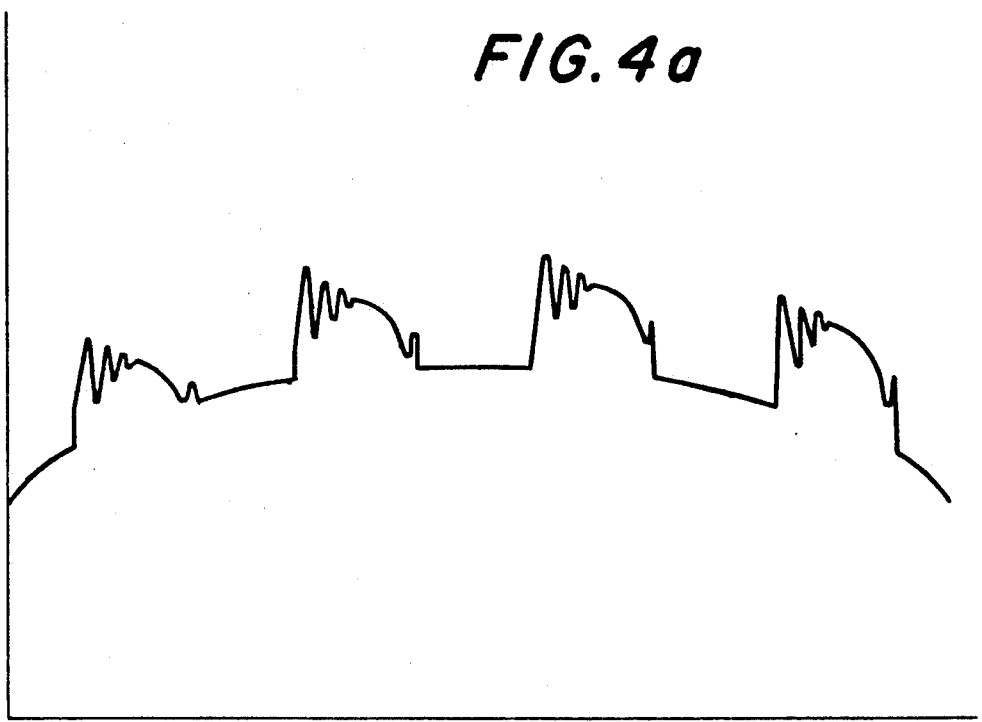
FIGS. 4a–4d are graphical depictions of the signal generated in several portions of the electronic apparatus depicted in FIG. 1.
Figure 4B:
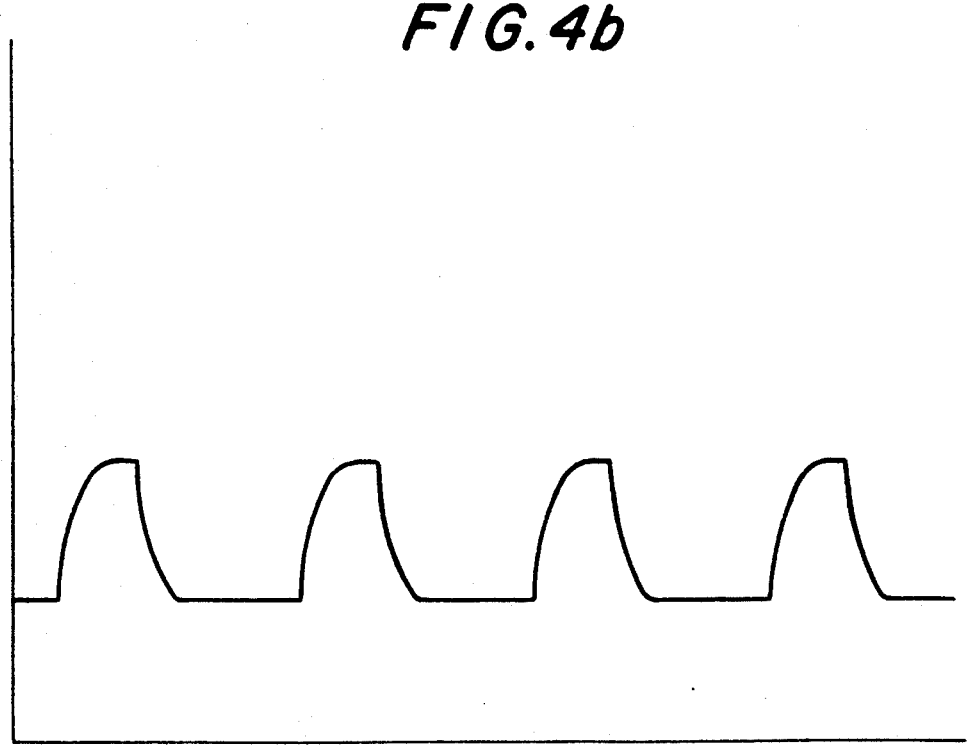
Figure 4C:
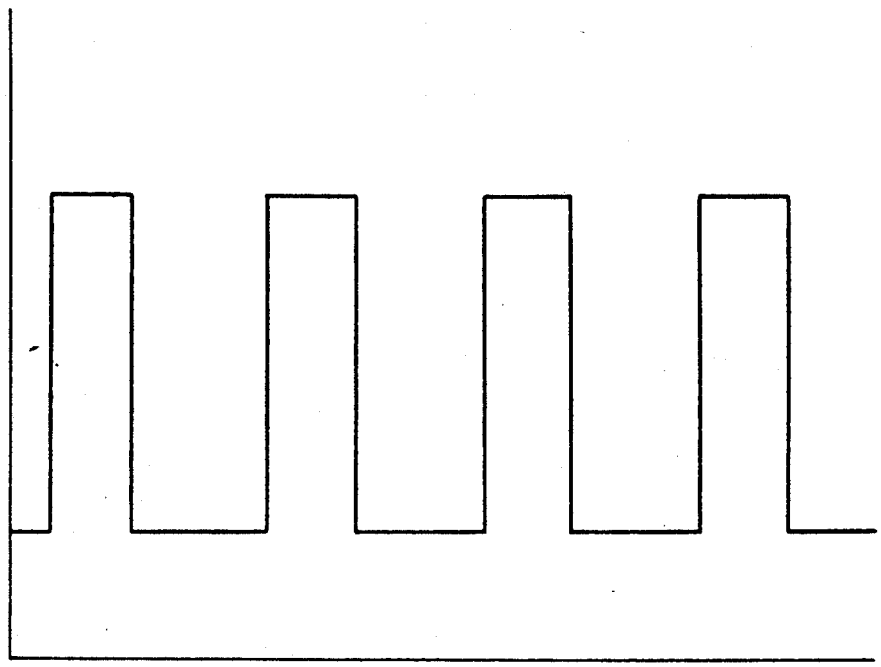
Figure 4D:
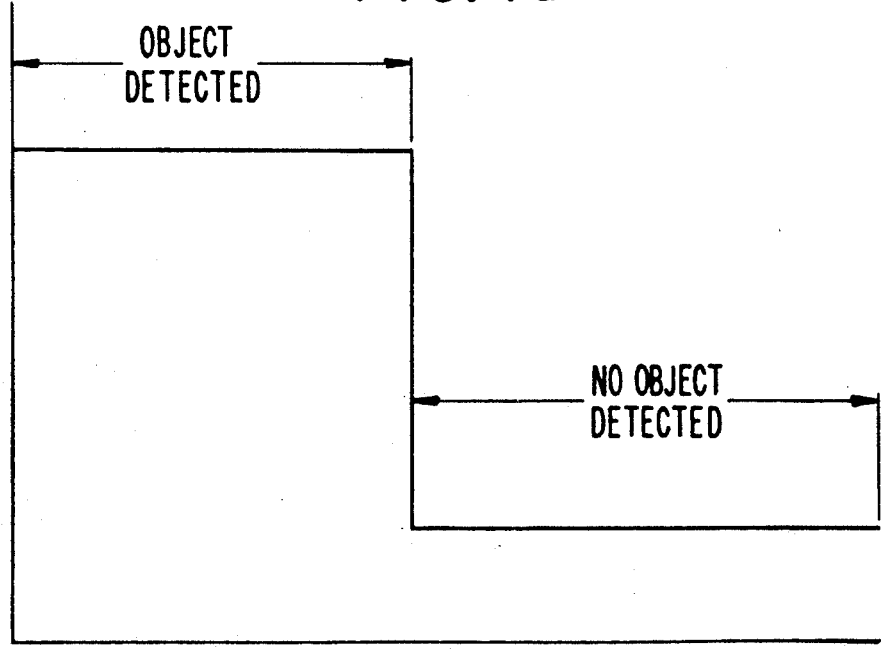

To circumvent the problem of circuit noise at such low signal levels, a low bias current detection amplifier 42 is provided. Although such amplifiers are available, they have not previously been used in photoelectric scanners. Useful such devices, presently on the market, are manufactured by National Semiconductor, and by Texas Instruments. Although other amplifiers of this type can be utilized, it is important that the bias current for any such amplifiers be less than about 3 nanoamps ("nA"). The electric current generated by the PIN diode 40 is then amplified as a series of voltage peaks (FIG. 4a), which are usually at least partially obscured by background radiation; the background radiation is removed in the background compensation element 44, where a high pass filter 45, designed to screen out all pulse frequencies lower than, e.g., 1000 Hz, substantially eliminates the background noise and only permits the higher frequency coherent light signal, generated as voltage, to pass. Thus, the signal generated by the background compensator 44, has the waveform, passing though the conductor 52, as shown in FIG. 4b, and corresponds to a modified LED reflected light signal.

The compensated output from conductor 52 is then passed through what is broadly described as "output conditioner 46", which comprises as shown in the circuit diagram, an adjustable amplifier 47, a high frequency filter 49 (to remove high frequency noise, or interference, that may be present and created either by some external light source or from within the electronic system), and a trigger circuit 55, which comprises two type 7414 integrated Schmitt trigger circuits 65, flanking a missing pulse conditioning circuit 63, which includes a type 556 integrated circuit timer 61. The trigger circuit 55 squares up the wave form to more nearly approach the optimum level logic pulse; and then the missing pulses are detected in the status section 67, as indicating, e.g., that an object 32 has passed through the sensing area between the remote optical head 9 and the retro-reflector 31.

Status conditioning is accomplished utilizing the two 2N3904 transistors 71 and 73, which perform an output function, such as moving a counter one digit, turning on an indicator lamp, sounding an alarm, or closing a relay. The nature of the output function is dependent on the application to which the system is put and is not a crucial element to the device of this invention.

The major electronic components of the system utilized in this invention are primarily formed as integrated circuits, including for example, the initial detection amplifier 42, the background compensator 44, the secondary adjustable amplifier 47, and the high frequency filter 49, the pulse timer circuit 61 and the two squaring up circuits 65 of the trigger circuit 55, as well as the modulation unit driving the LED.

Examples of the various electrical elements depicted in the schematic of FIG. 4 are given in Table 1, below:

TABLE I

COMPONENT LIST FOR PATENT

| Photo-Electric Circuit Item # | Description |
|---|---|
| IC1 | DUAL TIMER |
| IC2 | QUAD LOW BIAS CURRENT OR AMP |
| IC3 | SCHMITT TRIGGERS |
| Q1, Q3, Q4 | 2N3904 |
| Q2 | 2N3906 |
| PD1 | PHOTODIODE |
| LED1 | LED |
| RL1 | RELAY |
| C3 | 10 µf/16 V |
| C4 | 100 µf/10 V |
| C1, C6 | .1 µf/50 V |
| C2, 9, 10, 11, 12, 13 | .01 µf/50 V |
| C5, C6 | 47 Pf/100 V |
| C7, C8 | 5 pf/500 V |
| R5, R6 | 10MΩ/¼ W |
| R1, R2 | 4.7KΩ/¼ W |
| R3, R15, R16 | 3.9KΩ/¼ W |
| R4 | 51Ω/¼ W |
| R7, R8 | 20KΩ/¼ W |
| R9 | 13KΩ/¼ W |
| R10 | 39KΩ/¼ W |
| R11 | 1KΩ/¼ W |
| R12, R13 | 10KΩ/¼ W |
| R14 | 1MΩ/¼ W |
| R17 | 220Ω/¼ W |
| T1 | 1MΩ TRIMMER |

In the operation of this system, the remote optical head 9 is located directly facing, preferably, a retro-reflector surface 31. For example, conveyor belt 33 is placed between the optical head 9 and the retro-reflector surface 31 but below the line-of-sight between the two elements. As an object 32 supported by the conveyor passes across the field of view of the remote optical head 9, the continuous beam of light passing from the remote head 9 to the reflector surface 31 and back again is broken during the time that the item 32 is at that location. Breaking the light beam results in a discontinuity in the light passing to the PIN diode 40, and thus a discontinuity in the current output by the diode 40; after passing through the electronic system, the result is, for example, an increment in the count by the status output 69. As an additional use for this type of system, for example, the system can be used to detect movement, which may or may not be desirable and thus result in a different type of output from the status output 69; for example, an output responsive to an undesirable movement of a part, indicating separation or breakage, can be utilized to activate a cut-off switch.

As explained, the advantage of the system is that the remote photohead 9, with its extremely efficient light gathering system and electronic sensing system can be utilized at locations far removed from the power source, and the operator, thus permitting safe and continuing monitoring of moving parts without either increasing the likelihood of an accident by the introduction into a volatile environment of a additional power source, or by placing an operator in a position close to the potentially dangerous system.

The utilization of a single collimator type of lens with the light broadcasting end and the light collecting end substantially in the same plane as and close to but on opposite sides of, the lens focal point, permits a wider range of useful distance between the remote head and the retro-reflector, within which the system can operate. For example, the remote head can be separated by as little as a few inches or as much as 10 feet or more from the retro-reflector and still be able to operate with the desired accuracy.

The patentable embodiment of this invention which are claimed are as follows:

1. A remote sensing light broadcasting and collection head unit for use with photoelectric sensing apparatus, the head unit comprising a hollow body having a first forwardly facing opening and a second opening; a lens secured in the forwardly facing opening for the transmission of light therethrough between the exterior and interior of the hollow body; a passive light source having a radiating end and a passive light collector having a receiving end, secured in and through the second opening such that both said ends are substantially parallel to each other and adjacent to the focal point of said lens, such that the lens substantially collimates light emitted from the passive light source and passing through the lens in a direction forwardly of the head, and focuses received reflected collimated light passing through the lens, from outside of the head, substantially at the focal point of the lens; first and second light transmitting means connected to each of the passive light source and passive light collector, respectively, and designed to be remotely operably connected to a powered light source and a photoelectric detector, respectively and wherein said radiating end, said receiving end, and said focal point of said lens are all substantially in a straight line substantially parallel to the longitudinal axis of said lens such that all light passing to and from said radiating end and said receiving end passes through said lens.

2. The head unit of claim 1 wherein the light transmitting means are each a single optical glass fiber.

3. The head unit of claim 1, wherein the substantially straight line is in a plane substantially perpendicular to the lens axis.

4. Means for remotely sensing movement of an object, the sensing means comprising a remote sensing head unit in accordance with claim 1, the head unit designed to be located proximal to the object to be detected; a powered light source located distal from the sensing head and operatively connected to the first light transmitting means for providing pulsed light; photoelectric detection means located distal from the sensing head and comprising a light detector operatively connected to the second light transmitting means and adapted to convert detected light into electrical current; electric amplification means for amplifying the electrical current generated by the light detection means; means to detect a change in the intensity of light detected by the photoelectric detector; and means to register such change in light intensity.

5. The remote sensing means of claim 4, wherein the amplification means utilizes a bias current amplifier of not greater than 3 nA.

6. The remote sensing means of claim 5 further comprising means to remove the effect of background light from the light detected by the photoelectric detector.

* * * * *